United States Patent
Otyepka et al.

(10) Patent No.: US 12,448,291 B2
(45) Date of Patent: Oct. 21, 2025

(54) NITROGEN AND FLUORINE DOPED GRAPHENE AND USE THEREOF

(71) Applicant: UNIVERZITA PALACKEHO V OLOMOUCI, Olomouc (CZ)

(72) Inventors: Michal Otyepka, Olomouc (CZ); Ariesteidis Bakandritsos, Olomouc (CZ); Veronika Sedajova, Mestecko Trnavka (CZ); Petr Jakubec, Olomouc (CZ)

(73) Assignee: UNIVERZITA PALACKEHO V OLOMOUCI, Olomouc (CZ)

( * ) Notice: Subject to any disclaimer, the term of this patent is extended or adjusted under 35 U.S.C. 154(b) by 504 days.

(21) Appl. No.: 17/923,052

(22) PCT Filed: Feb. 9, 2021

(86) PCT No.: PCT/CZ2021/050016
§ 371 (c)(1),
(2) Date: Nov. 3, 2022

(87) PCT Pub. No.: WO2021/223783
PCT Pub. Date: Nov. 11, 2021

(65) Prior Publication Data
US 2023/0159335 A1  May 25, 2023

(30) Foreign Application Priority Data
May 6, 2020 (EP) .................... 20173178

(51) Int. Cl.
*C01B 32/194* (2017.01)
*H01G 11/36* (2013.01)
(Continued)

(52) U.S. Cl.
CPC ........ *C01B 32/194* (2017.08); *C01B 2204/22* (2013.01); *C01P 2002/70* (2013.01);
(Continued)

(58) Field of Classification Search
CPC ... C01B 32/194; C01B 2204/22; C01B 32/19; C01B 32/182; C01B 32/184;
(Continued)

(56) References Cited

U.S. PATENT DOCUMENTS

2011/0017587 A1 * 1/2011 Zhamu .................... C01B 32/19
204/157.62

FOREIGN PATENT DOCUMENTS

CN 106 276 885 A 1/2017
CN 109 607 521 A 4/2019

OTHER PUBLICATIONS

Duan, et al., A facile one-pot method to prepare nitrogen and fluorine co-doped three-dimensional graphene-like materials for supercapacitors, Journal of Materials Science: Materials in Electronics 2019; 30: 19505-19512 (Year: 2019).*
(Continued)

*Primary Examiner* — Daniel C. Mccracken
(74) *Attorney, Agent, or Firm* — Notaro, Michalos & Zaccaria P.C.

(57) ABSTRACT

A method is disclosed for preparation of nitrogen-doped graphene having these steps: a) providing a dispersion of fluorinated graphite; b) subjecting the dispersion of fluorinated graphite to sonication and/or mechanical treatment and/or thermal treatment; c) contacting the product from step b) with an azide reagent at a temperature within the range of 40 to 200° C.; d) separating the solid product formed in step c) from the mixture; e) dialyzing the product obtained in step d) against water. A nitrogen-doped graphene containing at least 8.9 at. % of nitrogen and up to 16.6 at. % of fluorine is yielded, wherein the at. % are relative to the total atoms present in the sample and determined by X-ray photoelectron spectroscopy (XPS) using an Al-Kα source; and having a density above 1.2 g/cm3 when pressed at 80 kN
(Continued)

for 1 min. This nitrogen-doped graphene is particularly useful as a supercapacitor material.

14 Claims, 6 Drawing Sheets

(51) Int. Cl.
    *H01G 11/52*     (2013.01)
    *H01G 11/62*     (2013.01)

(52) U.S. Cl.
    CPC .............. *H01G 11/36* (2013.01); *H01G 11/52* (2013.01); *H01G 11/62* (2013.01)

(58) Field of Classification Search
    CPC ... C01B 32/186; C01B 32/188; C01B 32/192; C01B 32/196; C01B 32/198; C01B 2204/00; C01B 2204/02; C01B 2204/04; C01B 2204/06; C01B 2204/065; C01B 2204/20; C01B 2204/24; C01B 2204/26; C01B 2204/28; C01B 2204/30; C01B 2204/32; C01B 32/20; C01B 32/205; C01B 32/21; C01B 32/215; C01B 32/22; C01B 32/225; C01B 32/23; C01P 2002/70; H01G 11/36; H01G 11/52; H01G 11/62; H01G 11/86; Y02E 60/13
See application file for complete search history.

(56) References Cited

OTHER PUBLICATIONS

Duan, Diancheng, et al.; "A facile one-pot method to prepare nitrogen and fluorine co-doped three-dimensional graphene-like materials for supercapacitors"; Journal of Materials Science. Materials in Electronics, Chapman and Hall, 2019; 30(21):19505-19512.

Sim, Yelyn, et al.; "The synergistic effect of nitrogen and fluorine co-doping in graphene quantum dot catalysts for full water splitting and supercapacitor"; Applied Surface Science 2019; 507L 145157, pp. 1-8.

Shu, Jiang, et al.; "Nitrogen and fluorine dual-doped mesoporous graphene: a high-performance metal-free ORR electrocatalyst with a super-low HO 2-yield"; Nanoscale 2015; 7(24):10584-10589.

Posudievsky, O. Yu, et al.; "Facile mechanochemical preparation of nitrogen and fluorine co-doped graphene and its electrocatalytic performance"; Carbon 2019; 152:274-283.

Qiao, Xiaochang, et al.; "Simultaneous doping of nitrogen and fluorine into reduced graphene oxide: A highly active metal-free electrocatalyst for oxygen reduction"; Carbon 2015; 99:272-279.

International Search Report/Written Opinion of the International Searching Authority and replacement Written Opinion of the International Searching Authority, Jul. 7, 2021.

International Application Status Report, obtained Oct. 24, 2022.

European Patent Office Extended European Search Report, dated Oct. 30, 2020.

Applicant informal comments to Extended European Search Report, dated Feb. 9, 2021.

* cited by examiner

NITROGEN AND FLUORINE DOPED GRAPHENE AND USE THEREOF

FIELD OF ART

The present invention relates to a novel method of preparing nitrogen-doped graphene, which produced graphene with high nitrogen doping and some residual fluorine content. The resulting material allows forming electrodes for supercapacitors with a high volumetric energy density at a high power density.

BACKGROUND ART

Supercapacitors represent an energy storage technology with remarkable qualities, such as fast charging/discharging capability (i.e. high power density) and extralong cycle-life. Intense efforts are focused on increasing their energy density, which is approximately one order of magnitude lower than that of batteries, without sacrificing their power density. Adsorption/desorption of ions dissolved in the electrolyte of the supercapacitor cell to the surface of the electrode materials is involved in the energy storage mechanism of supercapacitors. Due to the importance of these interfacial phenomena, intense efforts have been focused on high surface area porous carbons. However, such carbons have a very low density (ca. 0.3-0.5 $g/cm^{-1}$), leading to large empty space in the electrode which is then filled with electrolyte. Thus, this non-interfacial electrolyte-filled space of the pores does not add to the capacitance, limiting the energy density of the material.

A further strategy to improve the adsorption of ions and supercapacitor performance is to render the surface of carbon or graphene-based electrodes more polar by doping with nitrogen or other elements. Nitrogen doping in carbons has been beneficial also from the point of view of electronic conductivity and wettability, as well as for ascribing pseudo-capacitance (charge storage through redox processes). In principle, nitrogen-doped graphene is currently produced by two groups of methods: direct synthesis methods, such as chemical vapor deposition, arc discharge and segregation growth techniques, or by post treatment, such as by nitrogen plasma treatment, and by interaction with nitrogen containing molecules during heat, ultrasonic, solvothermal, or microwave treatment. The usual nitrogen loading achieved is 1 to 8 at. %.

In particular cases, graphene-based materials were super-doped with nitrogen (a term used for doping with higher than ca. 10 at. %) when the graphene precursors were first fluorinated before the N-doping reaction, affording N and F containing derivatives. Fluorination is used to create vacancies/defects into the graphene sheets in order to allow for the higher doping with nitrogen, of up to 12.5 at. % (e.g. J. Chem. Tech. Biotech., 2019, vol. 94, 3530-3537) and up to 30 at. %, (Yuan Liu et al. in Nature Comm. 2016, vol. 7, 10921). In the first case (J. Chem. Tech. Biotech., 2019, vol. 94, 3530-3537) a capacitance of 225 F/g was attained with energy density of 7.8 Wh/kg at 0.12 kW/kg of power density. In the second case, the 30 at. % N containing graphene material was tested as a supercapacitor electrode in three-electrode system (one working electrode). A capacitance of 390 F/g was attained but with very limited gravimetric energy density of 8.6 Wh/kg at 0.5 kW/kg of power density. An extremely similar procedure leading to a nitrogen content on graphene up to 15.8 at. % was published by the authors of the previous work, and others, in Adv. Mater. 2017, vol. 29(36), 1701677. In this case, the material was tested in the full cell device (two electrodes with active material) with performance of 280 F/g, and energy density of 6.2 Wh/kg at 0.12 kW/kg of power density. Such gravimetric energy densities are particularly low for increasing the competitiveness of supercapacitors. With such gravimetric densities, to reach the 90 Wh/L, which has been achieved with compressed or densified graphene-based electrodes (see later), a density of more than 10 $g/cm^3$ would be required, which is impossible for carbon-based materials. For comparison, the densities of graphite, diamond and metallic iron are 2.26, 3.51, and 7.87 $g/cm^{-1}$, respectively. In an alternative strategy (J. Mater. Chem. A, 2019, vol. 7, 3353-3365), fluorinated graphite was used to promote the covalent modification of graphene with nitrogen containing molecules (for example ethylenediamine), affording a graphene-based network containing electroactive nitrogen atoms (15 at. %) outside the plane of the graphene skeleton and small amount of fluorine (0.5-2 at. %). The same work also reported that by adding sodium amide in the reaction of graphite fluoride with ethylenediamine, the final nitrogen content was increased. A supercapacitor device using this product afforded 326 F/g, and energy density 18 Wh/kg at 7 kW/kg of power density. By applying capillary compression, the density of the product increased from 0.13 $g/cm^3$ to 1.33 $g/cm^{-1}$, leading to higher volumetric energy density of 20 Wh/L at 9 kW/L.

More related to the present invention, a strategy to increase the volumetric energy density of the supercapacitors is to increase the density of the active electrode materials by controlling their pore size in order to avoid the non-exploitable volume, but without sacrificing the ability to adsorb the ions of the electrolytes. Murali et al. in Nano Energy 2013, vol. 2, 764-768 compressed the carbon (graphene-based) electrode to increase its density from 0.34 to 0.75 $g/cm^{-1}$, leading to a significant improvement of the volumetric energy density from 26 to 48 Wh/L. Shortly after, X. Yang et al. (Science 2013, vol. 341, 534-537), in order to further increase the density of the graphene-based electrodes, used capillary densification of a chemically reduced graphene gel in presence of an ionic liquid achieving a density of 1.3 $g/cm^{-1}$. This product delivered 90 Wh/L at 1.1 kW/L. It was deduced that the capillary condensation aided the densification, and the presence of the non evaporating ionic liquid prevented the restacking of the graphene sheets contributing to the preservation of charge storage and transport properties. A year later in Nature Commun. 2014, vol. 5, 5554, treatment of a chemically reduced graphene oxide with $H_2O_2$, ascribed a holey structure to the sheets, which proved an alternative way to promote three-dimensional ionic storage and transport, which after mechanical compression resulted to a density of 0.7 $g/cm^3$ and a similar energy density of 85 Wh/L but improved power density of 1.75 kW/L. Other attempts to boost volumetric energy density through high-density heteroatom tri-doped carbons and alternative capillary-densification, did not prove viable, achieving 40 Wh/L and 65 Wh/L, respectively. Such record values at ca. 90 Wh/L are ~5 times higher than commercial high performance active carbons, and can thus compete with lead acid and metal hydride batteries. Theoretically, though, graphene may potentially reach as high as 300 Wh/L, posing a challenge for turning supercapacitors to a competitive energy storage technology, if combined with their unparalleled power density and stability.

In general, the utilization of such nitrogen or nitrogen and fluorine containing graphene-materials for the fabrication of supercapacitor electrodes with volumetric energy densities higher than ca. 90 Wh/L at power densities higher than 2 kW/L or mass densities of such materials and of their respective electrode-formulations higher than 2.26 g/cm$^3$ (which is the density of bulk graphite) have not yet been achieved.

DISCLOSURE OF THE INVENTION

The present invention provides a method for preparation of nitrogen-doped graphene which contains the following steps:
a) providing a dispersion of fluorinated graphite;
b) subjecting the dispersion of fluorinated graphite to sonication and/or mechanical treatment and/or thermal treatment;
c) contacting the product from step b) with an azide reagent at a temperature of 40 to 200° C.;
d) separating the solid product formed in step c) from the mixture;
e) dialysis of the product against water.

The term "fluorinated graphite" includes fluorographite, graphite fluoride, fluorinated graphite, and exfoliated forms of these materials. Fluorinated graphites are also available under the name poly(carbon monofluoride), carbon monofluoride or poly(carbon fluoride). The initial content of fluorine in the starting fluorinated graphite is typically at least 40 at. %, more preferably at least 45 or at least 50 at. %, relative to the total atoms present in the sample and determined by X-ray photoelectron spectroscopy (XPS) using an Al-K$\alpha$ source.

The term "N-doped graphene" or "nitrogen-doped graphene" means graphene with N-atoms (nitrogen atoms) incorporated in the graphene lattice. This term encompasses single-layer graphene, as well as materials comprising single-layer graphene in a mixture with moieties (e.g., flakes) or particles containing a plurality of graphene layers. However, this term also covers graphene wherein a small proportion (e.g., up to 10% or up to 5%) of the nitrogen atoms are bound to the carbon atoms as out-of-plane substituents (e.g. amino-groups), i.e. not incorporated in the graphene lattice. This term also covers graphene wherein a small amount of fluorine is present as well (up to 16.6 at. %; preferably lower than 5 at. %).

Mechanical treatment preferably includes at least one treatment selected from high-shear mixing, stirring, vigorous stirring, stirring with magnetic bar, stirring with a mechanical stirrer.

Thermal treatment preferably includes heating the dispersion in step b) to a temperature within the range of 50 to 250° C., or from 80 to 200° C., or more preferably from 100 to 150° C. It can also include the treatment inside a solvothermal reactor at pressures higher than the normal atmospheric pressure.

The dispersion prepared in step a) is a dispersion of fluorinated graphite in a solvent. The solvent is preferably a polar solvent or a mixture of a polar and a non-polar solvent. The solvent may preferably be selected from dimethylformamide (DMF), dimethylsulfoxide (DMSO), N-methyl-2-pyrrolidone (NMP), N,N-dimethylacetamide (DMA), glycols such as ethylene glycol, and mixtures thereof. Less polar or non-polar solvents such as acetonitrile, benzene, toluene or chlorobenzene may be used in combination with a polar organic solvent (for example DMF, NMP, DMSO, DMA).

The invention also encompasses embodiments in which a different solvent is used for sonication and/or mechanical treatment and/or thermal treatment than the solvent used for the reaction with the azide reagent.

The step of sonication and/or mechanical treatment and/or thermal treatment yields a mixture containing fluorinated graphene and/or exfoliated fluorinated graphite particles. Sonication is typically carried out at frequency range of 20 kHz to 100 kHz and for a period of at least 2 hours, more preferably of at least 3 hours, even more preferably at least 4 hours. The thermal treatment is typically carried out at the temperature range of 40-200° C. and for a period of at least 1 hour or preferably at least 6 hours, more preferably at least 24 hours, even more preferably 80 hours. The mechanical treatment is most typically carried out by high-shear mixing or magnetic bar stirring.

The azide reagent is preferably added to the solvent of the reaction as a powder or in the form of a suspension in a solvent.

The solvent is preferably a polar solvent. The solvent may preferably be selected from dimethylformamide (DMF), dimethylsulfoxide (DMSO), N-methyl-2-pyrrolidone (NMP), N,N-dimethylacetamide (DMA), glycols such as ethylene glycol, and mixtures thereof. Less polar or non-polar solvents such as acetonitrile, benzene, toluene or chlorobenzene may be used in combination with a polar organic solvent (for example DMF, NMP, DMSO, DMA). In a particularly preferred embodiment, the solvent is the same as the solvent used for preparing the dispersion of fluorinated graphene prepared in step b).

The azide reagent may preferably be selected from metal azides, tri(C1-C4)alkylsilyl azides. More preferably, the azide reagent is selected from NaN$_3$, KN$_3$, LiN$_3$, Pb(N$_3$)$_2$, trimethylsilyl azide.

After contacting the product of step b) containing fluorinated graphene with the azide reagent, the mixture is typically subjected to heating to a temperature within the range of 40-200° C., preferably 70-170° C., even more preferably 100-140° C. The heating is preferably carried out for at least 4 hours, preferably for 4 hours to 20 days, even more preferably for at least 8 hours, yet more preferably for at least 24 hours, and even more preferably for at least 2 days (48 hours) or for at least 3 days (72 hours). The longer is the period of heating, the higher is the nitrogen doping.

The step of isolation of the product (nitrogen-doped graphene) may be performed by known techniques such as centrifugation, sedimentation or filtration.

The method of the invention allows to prepare graphene containing nitrogen and fluorine atoms. The final nitrogen-doped graphene usually contains residual fluorine atoms, but the method allows to reliably achieve a higher nitrogen doping than most methods known in the prior art; the achieved nitrogen doping is at least 8.9 at. % when the reaction of step c) is performed for 4 hours, at least 13.9 at. % when the reaction of step c) is performed for 24 hours, and at least 16.1 at. % when the reaction of step c) is performed for 72 hours. The prepared nitrogen-doped graphene has a density above 1.2 g/cm$^3$ when pressed at 80 kN for 1 min, preferably 1.4 g/cm$^3$ or more when pressed at 80 kN for 1 min. The process allows to achieve densities over 2 g/cm$^3$ or more when pressed at 80 kN for 1 min. The highest density achieved in the Examples was 2.7 g/cm$^3$ when pressed at 80 kN for 1 min (when the reaction of step c) is performed for 72 hours). Such density is higher than the density of any heretofore prepared graphite or graphene or graphene derivative. The process allowing to achieve these properties is simple and effective and uses economically effective starting compounds.

In particular, the method of the invention is the only wet-process chemical method which can achieve such high nitrogen doping. Additionally, it is the only method achieving a high nitrogen doping at relatively low reaction temperature.

The nitrogen-doped graphene has a balanced mixture of parameters enabling its use as a supercapacitor electrode without the drawbacks typical for materials known in the art. In particular, its unprecedented density which is combined with the preservation of its ability to absorb ions from the electrolyte, leads to an ultrahigh volumetric energy density, which is higher than any previous N and F containing graphene-based supercapacitor material, according to the prior art. The highest achieved value of volumetric energy density as described in the Examples was almost 170 Wh/L at volumetric power density 5.2 kW/L.

A further object of the invention is nitrogen-doped graphene containing at least 8.9 at. % (preferably at least 13.9 at. %) of nitrogen and up to 16.6 at. % (preferably up to 5 at. %) of fluorine, wherein the at. % are relative to the total atoms present in the sample and determined by X-ray photoelectron spectroscopy (XPS) using an Al-Kα source, and which has a density above 1.2 g/cm$^3$ when pressed at 80 kN for 1 min (preferably 1.4 g/cm$^3$ or more when pressed at 80 kN for 1 min).

The high densities are achieved primarily due to the step of dialysis against water.

Preferably the nitrogen-doped graphene contains at least 16 at. % (more preferably at least 16.1 at. %) of nitrogen and/or up to 5 at. % (more preferably up to 2 at. %, even more preferably up to 1.5 at. %) of fluorine, relative to the total atoms present in the sample and determined by X-ray photoelectron spectroscopy (XPS) using an Al-Kα source.

There is typically at least a minimum residual content of fluorine which is about 0.1 at. % or about 0.3 at. %, relative to the total atoms present in the sample and determined by X-ray photoelectron spectroscopy (XPS) using an Al-Kα source.

The content of nitrogen in the nitrogen-doped graphene with the present method of production could peak approximately around 20 at. %, relative to the total atoms present in the sample and determined by X-ray photoelectron spectroscopy (XPS) using an Al-Kα source.

Preferably, the product has a density above 2 g/cm$^3$ when pressed at 80 kN for 1 min.

The measurements of density were performed by applying 4 mg of the material, dispersed in 20 microliters solvent (for instance N-methyl-2-pyrrolidone), on aluminium foil, allowing the dispersion to dry up and then pressing for 1 min at 80 kN.

In some embodiments, the product has a surface area (BET) as measured by $N_2$ adsorption/desorption measurements at 77 K within the range of 50-200 m$^2$/g, more preferably in the range of 55-150 m$^2$/g.

Another aspect of the present invention is the use of the nitrogen-doped graphene described above as a supercapacitor material. The nitrogen-doped graphene of the present invention possesses a high volumetric energy and power density and a high capacitance stability at cycling. A unique property of the materials giving rise to the high volumetric capacity is its high density after pressing.

The high densities (typically of at least 1.4 g/cm$^3$ when pressed at 80 kN for 1 min) result in high values of volumetric energy density and volumetric power density achievable with the product. The volumetric energy densities are typically above 30 Wh/L, and volumetric power densities are typically above 2.7 kW/L. Gravimetric energy densities are over 20 Wh/kg (preferably over 50 Wh/kg) at gravimetric power densities of at least 1.6 (preferably at least 1.8) kW/kg. All energy and power densities refer to materials pressed at 80 kN for 1 min, and to current density 2 A/g.

The invention also provides an electrical cell comprising at least two electrodes, a separator and an electrolyte, wherein at least one electrode contains or consists of the nitrogen-doped graphene described above.

The electrolyte can be a liquid electrolyte containing a salt or preferably an ionic liquid.

The electrical cell may contain at least two electrodes, wherein at least one electrode is made of the nitrogen-doped graphene of the present invention applied on aluminium foil, at least one separator membrane provided between the electrodes, the separator membrane(s) being soaked by an electrolyte, and current collectors attached to the electrodes.

In a particular embodiment, a two-electrode system and symmetrical full-cell supercapacitor device was used to evaluate the performance, rate stability and cyclic stability of the nitrogen doped graphene obtained from step (d). The nitrogen doped graphene was homogeneously dispersed in N-methyl-2-pyrrolidone adding polytetrafluoroethylene and carbon (TimCal), preferably at a mass ratio of 85:10:5, and sonicated, preferably for 4 hours, to form homogenous paste. The slurry was pasted on an aluminium foil. Next, the film was dried at 120° C. in vacuum oven overnight, and then two electrodes (in a particular embodiment with diameter 18 mm) were cut and pressed in between two metal plates with force 80 kN for 1 minute. Afterwards, the mass and thickness of the electrodes were measured and dried again at 120° C. under vacuum (40 mbar), preferably for 6 hours. The electrodes in the flask were transferred (under vacuum) to glovebox. The two electrodes were placed face-to-face with a separator membrane in between. The separator membrane was soaked with the selected electrolyte. The electrodes were enclosed in an air-tight packaging and the current collectors were connected with the testing equipment (the battery tester). Before actual testing of the supercapacitor cell, conditioning was performed by charging the cell at voltages lower than the final voltage used, and at lower current densities (below 1 A/g).

EXAMPLES OF CARRYING OUT THE INVENTION

Materials and Methods:

Graphite fluoride (>61 wt % F), NaN$_3$ (BioXtra), 1-Methyl-2-pyrrolidinone anhydrous, 99.5% and N,N-Dimethylformamide (≥98%) were purchased from Sigma-Aldrich. Acetone (pure) and ethanol (absolute) were purchased from Penta, Czech Republic. All chemicals were used without further purification. Ultrapure water was used for preparation of all aqueous solutions. FT-IR spectra were measured on an iS5 FTIR spectrometer (Thermo Nicolet), using the Smart Orbit ATR accessory with ZnSe crystal. A drop of a dispersion of the sample in ethanol or water was placed on a ZnSe crystal and left to dry and form a film in ambient environment. Spectral were recorded by summing 50 scans, with nitrogen gas was flowing through the ATR accessory during the measurement and also for the background acquisition. ATR and baseline correction were used for processing the collected spectra.

X-ray photoelectron spectroscopy (XPS) was performed on a PHI VersaProbe II (Physical Electronics) spectrometer, using an Al-Kα source (15 kV, 50 W). MultiPak (Ulvac-PHI, Inc.) software package was used for deconvolution of obtained data.

Images from transmission electron microscopy were obtained with a JEOL 2100 TEM, equipped with an emission gun of LaB$_6$ type, operating at 160 kV. The samples were also analyzed with scanning electron microscopy using Hitachi SU6600 instrument with accelerating voltage of 5 kV. For these analyses, a small droplet of a material dispersion in ultrapure water (concentration approximately 0.1 mg/ml) was placed on a carbon-coated copper grid and left for drying.

Thermal analysis was performed with an STA449 C Jupiter Netzsch instrument.

Surface area analysis was carried out by N$_2$ adsorption/desorption measurements at 77 K, using a volumetric gas adsorption analyser (3Flex, Micromeritics) up to 0.965 P/P$_0$. Prior the analysis, the samples were degassed under high vacuum (10$^{-4}$ Pa) at 130° C. for 12 hours, while high purity (99.999%) N$_2$, and He gases were used for the measurements. The Brunauer-Emmett-Teller area (BET) was calculated with respect to Rouquerol criteria for N$_2$ isotherm and assuming a molecular cross-sectional area of 16.2 Å$^2$ for N$_2$ (77 K).

A hydraulic press (Trystom spol. s.r.o., Olomouc) was used for pressing the films of the samples in between metallic plates.

Cyclic voltammetry (CV) and Galvanostatic Charge-Discharge (GCD) were performed on a Bio-Logic battery tester (BCS-810) controlled with the BT-Lab software (version 1.64).

The following passage defines the supercapacitor metrics which are used in the present document, and generally accepted in the field. Gravimetric specific capacitance (C$_s$ in F/g) and volumetric specific capacitance (C$_v$ in F/cm$^{-1}$) of the electrode material are calculated from galvanostatic charge-discharge curves according to the equations:

$$C_s = 2 \times \frac{I \cdot t}{m \cdot V} [F/g];$$

$$C_v = C_s \times \frac{m}{V_{el}} \text{ or}$$

$$C_s \times d [F/cm^3]$$

Gravimetric energy density (E$_g$), gravimetric power density (P$_g$), volumetric energy density (E$_v$) and volumetric power density (P$_v$) are calculated according to the equations:

$$E_g = \frac{1}{8} \times \frac{C_s \cdot V^2}{3.6} [Wh/kg];$$

$$P_g = \frac{E_g}{t} \times 3600 [W/kg];$$

$$E_v = \frac{1}{8} \times \frac{C_v \cdot V^2}{3.6} [Wh/L];$$

$$P_v = \frac{E_v}{t} \times 3600 [W/L]$$

wherein m (g) is the mass of active material in one electrode (including the mass of the binder and conductive additives), I (A) is the discharge current, t (s) is the discharge time, and V (V) is the potential change during discharge, V$_{el}$ (cm$^{-1}$) is the volume of electrode material on one electrode.

Example 1: Synthesis of Nitrogen-Doped Graphene (72 h Reaction)

In a glass spherical flask, 1 g of graphite fluoride was dispersed in 40 ml of DMF. The flask was covered and left stirring for 2 days. Then, it was sonicated for 4 hours and left stirring overnight. In a glass beaker, 2 g of NaN$_3$ was dissolved in 20 ml of DMF and then added to the graphite fluoride and/or few-layer fluorographene dispersion. The mixture was heated at 130° C. for 72 h in the hood with a condenser under stirring with teflon coated magnetic bar. After the end of heating, the reaction mixture was left to cool down and transferred to 50 ml falcon centrifuge tubes. The solid particles (the product) were separated from the solvent and by-products by centrifugation at 15000 rcf for ca. 10 mins. The supernatant was discarded, and the tube was refilled with the next washing solvent. The sample was homogenized by shaking for at least 1 minute to redisperse the precipitate in the new solvent. Washing was performed with different solvents: DMF (3×), acetone (3×), ethanol (3×), hot ethanol (1×), distilled water (3×) and hot distilled water (1×), then refilled back with distilled water. At the end, the dispersed solid was inserted in a dialysis bag (molecular weight cut-off 10 kDa) until the conductivity of the surrounding water stopped increasing above ca. 10 μS/cm and the conductivity inside the dialysis bag was ca. 5 μS/cm. The dispersion was finally removed from the dialysis bag and was stored for further use or dried.

Figure 1:
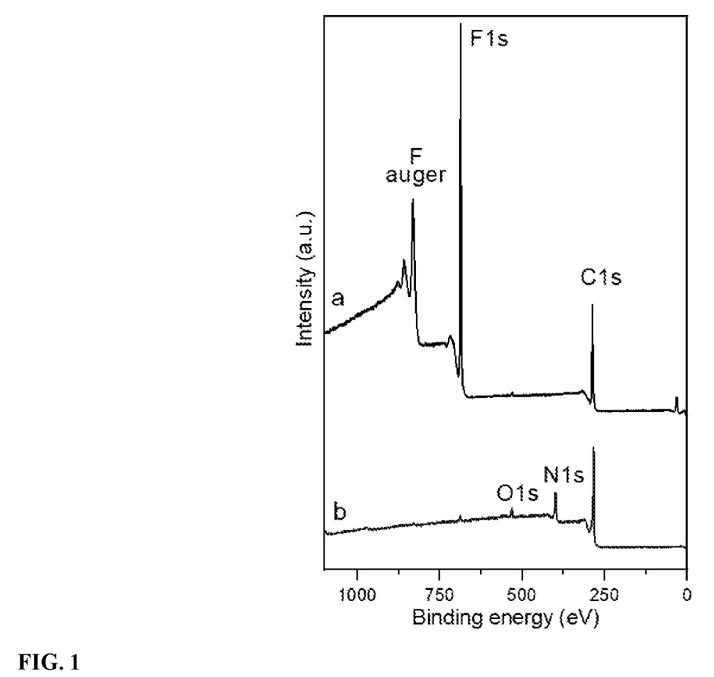
FIG. 1. X-ray photoelectron spectra of a) the starting fluorinated graphite and b) the product of Example 1.

X-ray photoelectron spectroscopy on the starting graphite fluoride and the product of Example 1 (FIG. 1) showed that the reaction with NaN$_3$ resulted in the introduction of N atoms in the product, reaching 16.1 at. % after 72 h of reaction, and in significant loss of fluorine atoms from 50.5 at. % to 1.5 at. % (Table 1).

Figure 2:
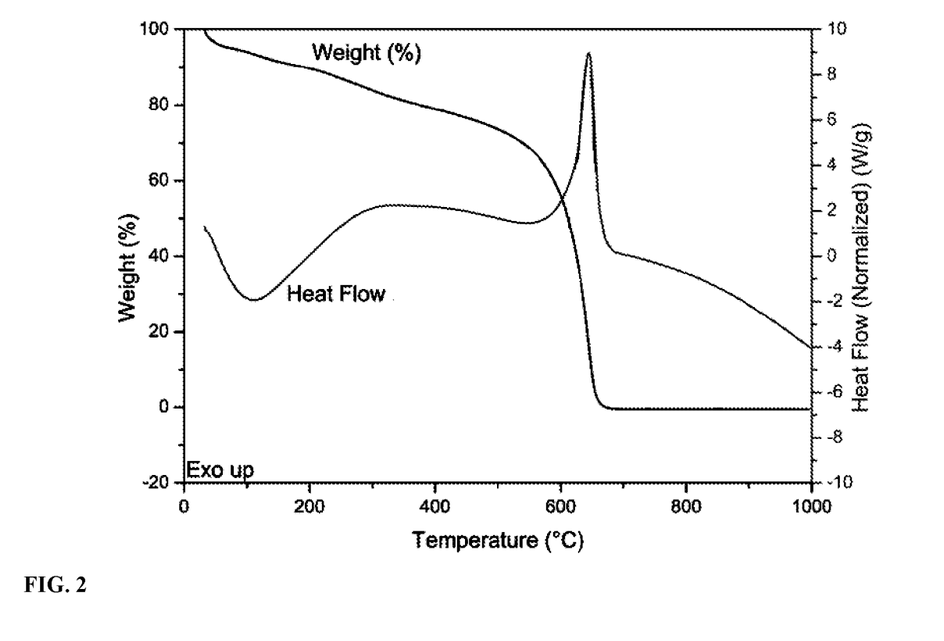
FIG. 2. Combined thermogravimetric analysis and differential scanning calorimetry of the solid product isolated from the reaction of Example 1. The analysis was performed in normal atmosphere, up to 1000° C. at 5° C./min. Exothermic processes are "up" in the graph.

Thermogravimetric analysis under normal atmosphere showed a slow mass loss of the material up to ca. 450° C. and a rapid decomposition step between ca. 500° C. and 680° C. (FIG. 2).

The density of the material measured after depositing 4 mg of the material on an aluminum foil and pressing for 1 min at 80 kN was 2.7 g/cm$^{-1}$. A part of the same batch of this product was not dialyzed and when pressed under identical conditions, the density was ca. 1.5 g/cm$^{-1}$.

Figure 3:
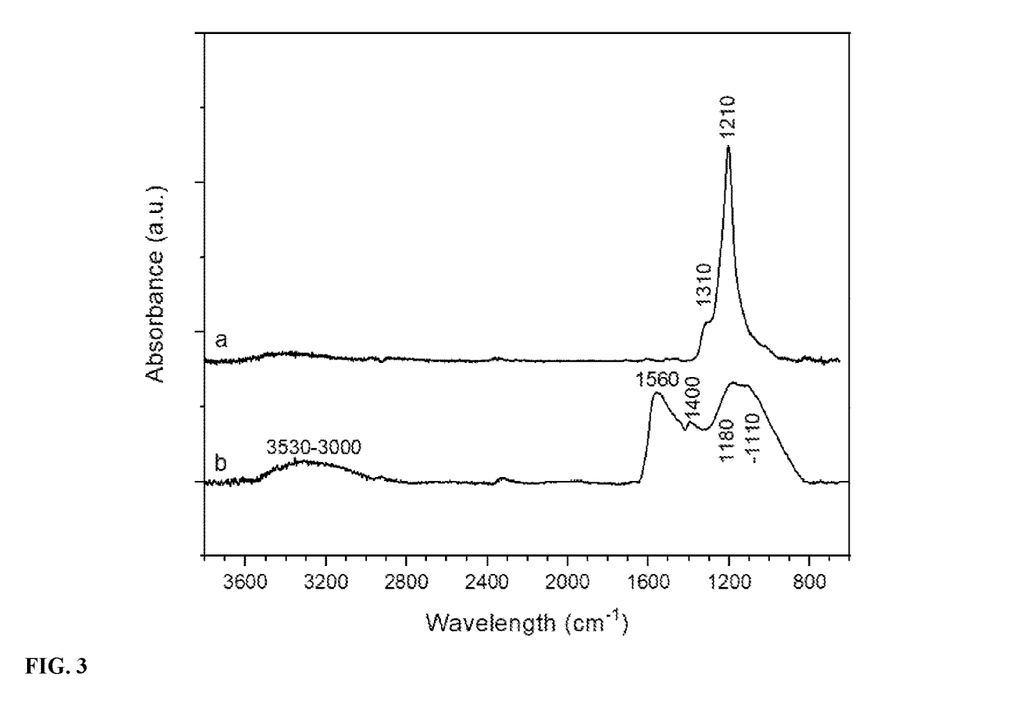
FIG. 3. Infra-red spectra of (a) the starting fluorinated graphite and (b) the product from Example 1.

The FT-IR spectrum of the starting graphite fluoride (FIG. 3a) showed the bands from the C—F and CF$_2$ bonds (1200 and 1310 cm$^{-1}$, respectively). On the contrary, the spectrum of the product (FIG. 3b) is dominated by the bands at 1560 and 1110-1180 cm$^{-1}$. These vibrations are typical for aromatic carbon and heterocyclic aromatic rings. Additional vibrational modes of the aromatic rings appearing at 1400 cm$^{-1}$ can be ascribed to heteroatom substitution (such as in pyridinic configurations). The 1110-1180 cm$^{-1}$ bands in the product overlap with the CF$_x$ vibrations in the staring fluorinated graphite, but as XPS confirmed, almost all F atoms (ca. 1.5 at. % residue) have been eliminated. These bands correspond to different modes of aromatic carbon and heterocycle ring stretching vibrations, in analogy with the 1560 and 1400 cm$^{-1}$ vibrations. The broad absorption above 3000 cm$^{-1}$ can be ascribed to stretching vibrations of N—H of primary or secondary amino groups (R$_2$N—H, R—NH$_2$), covalently attached perpendicularly to the graphene skeleton. In the same area —OH vibrations can also appear. The broad vibration at 1560 cm$^{-1}$ could also contain signal from bending vibrations of primary amino groups.

The specific surface area was 59 m$^2$/g, according to BET method, at N$_2$ sorption equilibration time of 20 s.

TABLE 1

Atomic contents as obtained from X-ray photoelectron spectroscopy analysis for the starting graphite fluoride and for the product of Example 1 (72 h product).

| Atomic contents % | C | N | O | F |
|---|---|---|---|---|
| Graphite fluoride | 48.4 | 0 | 1.1 | 50.5 |
| nitrogen-doped graphene, 72 h | 79.1 | 16.1 | 3.3 | 1.5 |

Example 2: Synthesis of Nitrogen-Doped Graphene (4 h Reaction)

The same procedure as in Example 1 was followed, but instead of heating the mixture at 130° C. for 72 h it was heated for 4 h.

The density of the material measured after dialysis and after depositing 4 mg of the material on an aluminum foil and pressing for 1 min at 80 kN was 1.4 g/cm$^{-1}$.

Figure 4:
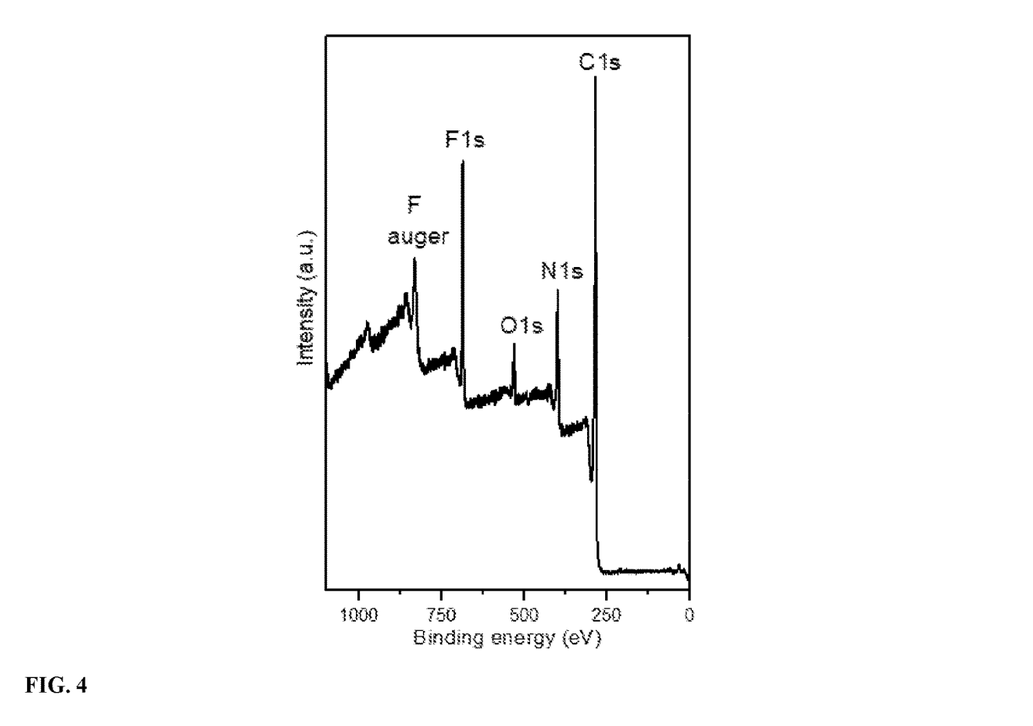
FIG. 4. X-ray photoelectron spectra of the product of Example 2 (after 4 h of reaction in DMF).

X-ray photoelectron spectroscopy on the product of this example (FIG. 4) showed that the reaction with NaN$_3$ resulted in the introduction of N atoms in the product, reaching 8.9 at. % after 4 h of reaction, and in significant loss of fluorine atoms from 50.5 at. % of the starting fluorinated graphite down to 16.6 at. % (Table 2).

The specific surface area was 146 m$^2$/g.

TABLE 2

Atomic contents as obtained from X-ray photoelectron spectroscopy analysis for the product of Example 2 (4 h product).

| atomic contents % | C | N | O | F |
|---|---|---|---|---|
| nitrogen-doped graphene, 4 h | 72.6 | 8.9 | 1.9 | 16.6 |

Example 3: Synthesis of Nitrogen-Doped Graphene (24 h Reaction)

The same procedure as in Example 1 was followed but instead of heating the mixture at 130° C. for 72 h it was heated for 24 h.

The density of the material measured after dialysis and after depositing 4 mg of the material on an aluminum foil and pressing for 1 min at 80 kN was 1.4 g/cm$^{-1}$.

Figure 5:
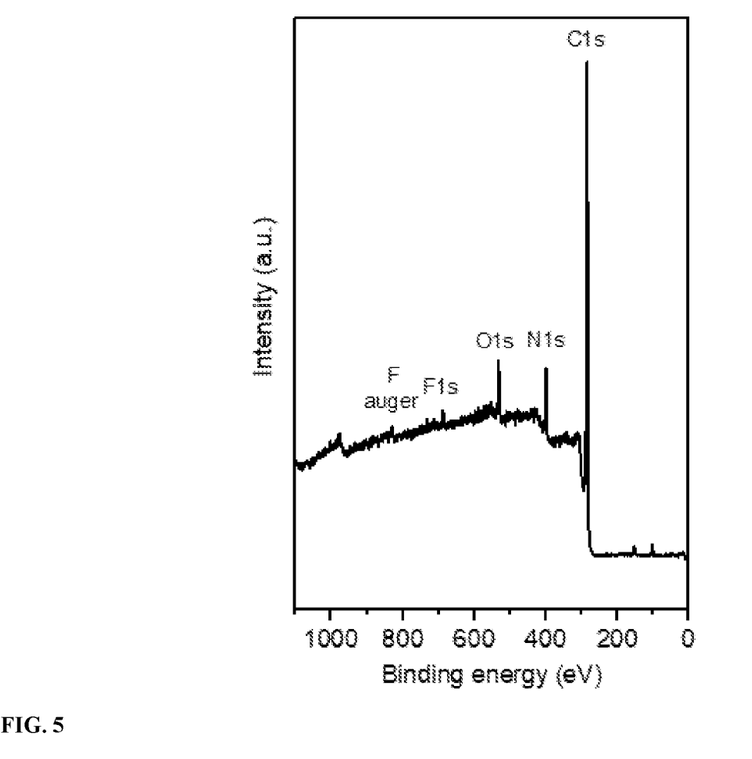
FIG. 5. X-ray photoelectron spectra of the product of Example 3 (after 24 h of reaction in DMF).

X-ray photoelectron spectroscopy on the product of this example (FIG. 5) showed that the reaction with NaN$_3$ resulted in the introduction of N atoms in the product, reaching 13.9 at. % after 24 h of reaction, and in significant loss of fluorine atoms from 50.5 at. % of the starting fluorinated graphite down to 1.6 at. % (Table 3).

The specific surface area was 127 m$^2$/g.

TABLE 3

Atomic contents as obtained from X-ray photoelectron spectroscopy analysis for the product of Example 3 (24 h product).

| atomic contents % | C | N | O | F |
|---|---|---|---|---|
| nitrogen-doped graphene, 24 h | 82.3 | 13.9 | 2.2 | 1.6 |

Example 4: Preparation of Nitrogen-Doped Graphene without Using Sonication, Centrifugation or Dialysis for Washing (Comparative Example)

In a glass spherical flask, 0.25 g of graphite fluoride was dispersed in 10 ml of DMF. The flask was covered and left stirring for 3 days. Then 0.5 g of NaN$_3$ was added to the flask, and the sonication step described in the Example 1 was omitted. The mixture was heated at 130° C. for 72 hours in the hood with a condenser under stirring with teflon coated magnetic bar. After the end of heating, the reaction mixture was left to cool down and filtered on Si sintered glass with filter paper. Washing was performed on frita with DMF (3×) and distilled water (3×) and hot distilled water (1×). The conductivity of the filtrate was measured to check the purity of the product. If the conductivity was more than 100 μS/cm, then more washing steps with water were performed. The solid was finally redispersed in distilled water, and characterization was performed (conductivity, zeta potential, pH, concentration, infra-red and X-ray photoelectron Spectroscopy) and stored for further use. The dialysis step described in Example 1 was omitted.

The density of the material measured after depositing 4 mg of the material on an aluminum foil, and pressing for 1 min at 80 kN was 0.7 g/cm$^{-1}$.

Figure 6:
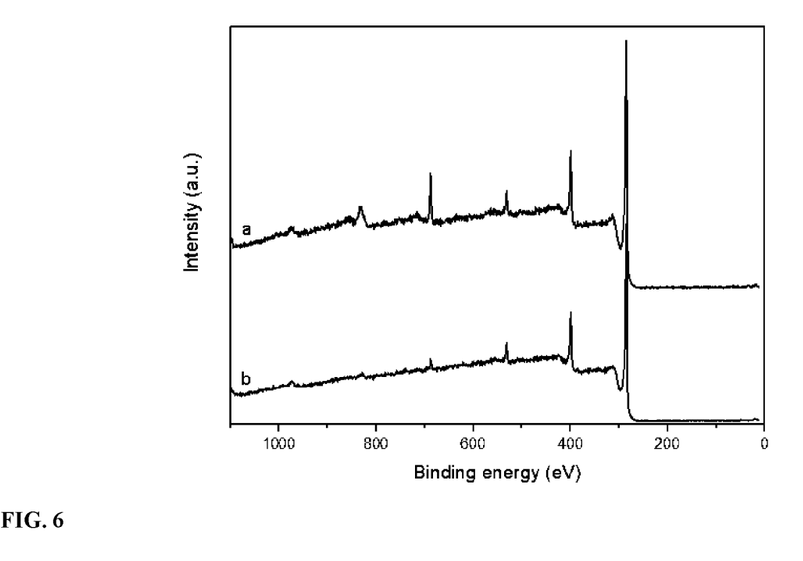
FIG. 6. X-ray photoelectron spectra of a) the product from Example 4 and for comparison b) the product from Example 1.

X-ray photoelectron spectroscopy on the product of this example (FIG. 6) showed that the reaction with NaN$_3$ resulted in the introduction of N atoms in the product, reaching 15 at. % after 72 h of reaction, and in significant loss of fluorine atoms from 50.5 at. % of the starting fluorinated graphite down to 4.6 at. % (Table 4).

TABLE 4

Atomic contents as obtained from X-ray photoelectron spectroscopy analysis for the product of Example 4 (no dialysis).

| atomic contents % | C | N | O | F |
|---|---|---|---|---|
| nitrogen-doped graphene, no-dialysis | 77.2 | 15 | 3.2 | 4.6 |

Example 5: Electrochemical Testing in a Two Electrode Symmetric Supercapacitor Full-Cell Using the Product from Example 1 (72 h Product)

Figure 7:
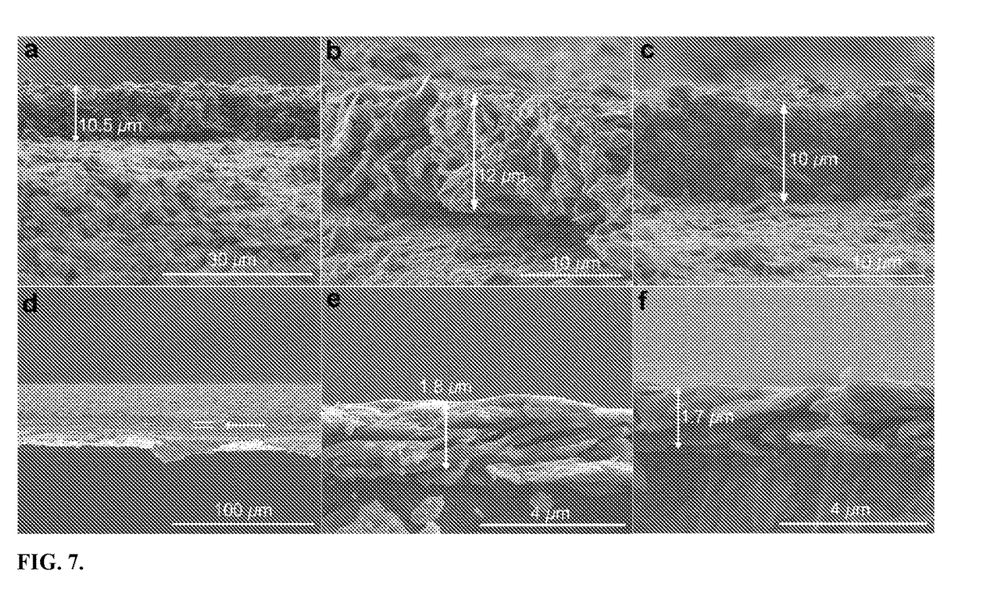
FIG. 7. Scanning electron microscopy images of the film of the electrode material (prepared as described in Example 5) pasted on the aluminium foil a-c) before pressing and d-f) after pressing in between two metal plates with force 80 kN for 1 minute.

The active material (nitrogen-doped graphene from Example 1) was homogeneously dispersed in N-methyl-2-pyrrolidone (p.a.≥99%, Sigma-Aldrich) with binder PTFE (Sigma-Aldrich) and conductive carbon (TimCal from MTI) at a ratio of 85:10:5 and sonicated for 4 hours to form homogenous paste. The slurry was pasted on a carbon-coated aluminium foil (Cambridge Energy Solutions, thickness 15 µm) with dr.'s blade technique (Erichsen, Quadruple Film Applicator, Model 360). The obtained film, containing flakes of the nitrogen-doped graphene, was examined with scanning electron microscopy (FIG. 7a-c) showing a thickness of 10-12 µm, with flakes oriented in random manner (FIG. 7b). Next, the film was dried at 120° C. in vacuum oven overnight, before two electrodes with diameter of 18 mm were cut and pressed in between two metal plates with force 80 kN for 1 minute (Trystom spol. s.r.o., Olomouc). After pressing, the film thickness reduced to 1.7 to 1.8 µm, whereby the lamellar structure was evident, and with high degree of orientation (FIG. 7d-f) in parallel to the aluminium foil. The two electrodes with diameter of 1.8 cm (loaded electrode material 1.4 and 1.3 mg respectively) were dried again at 120° C. under vacuum (40 mbar) for 6 hours and transferred (under vacuum) to glovebox ($O_2$ and $H_2O$ content<2 ppm, under argon atmosphere). According to these values, the density of the produced film was 2.7 $g/cm^{-1}$. For assembly of the supercapacitor device, the two electrodes were placed in a sleeve (E1-Cell insulator sleeves equipped with Whatman® glass microfiber paper separator with thickness 0.26 mm). The separator membrane was soaked with 90-100 µl of electrolyte. A mixture of 1-ethyl-3-methylimidazolium tetrafluoroborate ($EMIM-BF_4$, from Sigma Aldrich,≥99.0%(HPLC)) and 1,1,2,2-tetrafluoroethyl-2,2,3,3-tetrafluoropropyl ether (TTE from Tokyo Chemical Industry, >95.0%) in ratio 90:10 was used as electrolyte, which were dried prior use with molecular sieves. The electrodes were enclosed inside the sleeve with stainless steel plungers, and whole device was tightened and connected to the battery tester for analysis.

Before testing the device, conditioning of the electrode materials was performed as follows:

Hold of potential for 5 minutes at 1.2 V, 20 cycles at current density 0.5 A/g up to 2 V, 20 cycles at current density 1 A/g up to 3.7 V.

Figure 8:
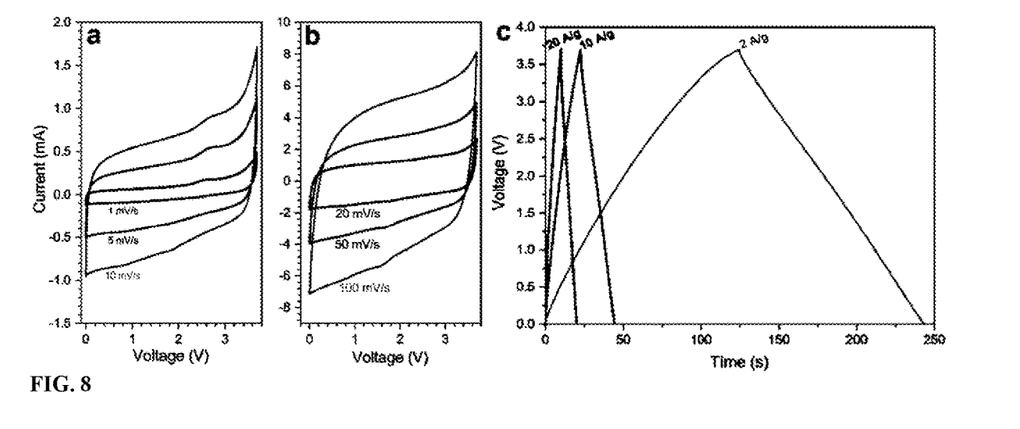
FIG. 8. Electrochemical characterization of the product from Example 1. a-b) cyclic voltammetry curves in EMIM-BF$_4$ and TTE (9:1) electrolyte, at lower (panel a) and higher (panel b) scan rates; c) galvanostatic charge-discharge profiles at different current densities.
Figure 9:
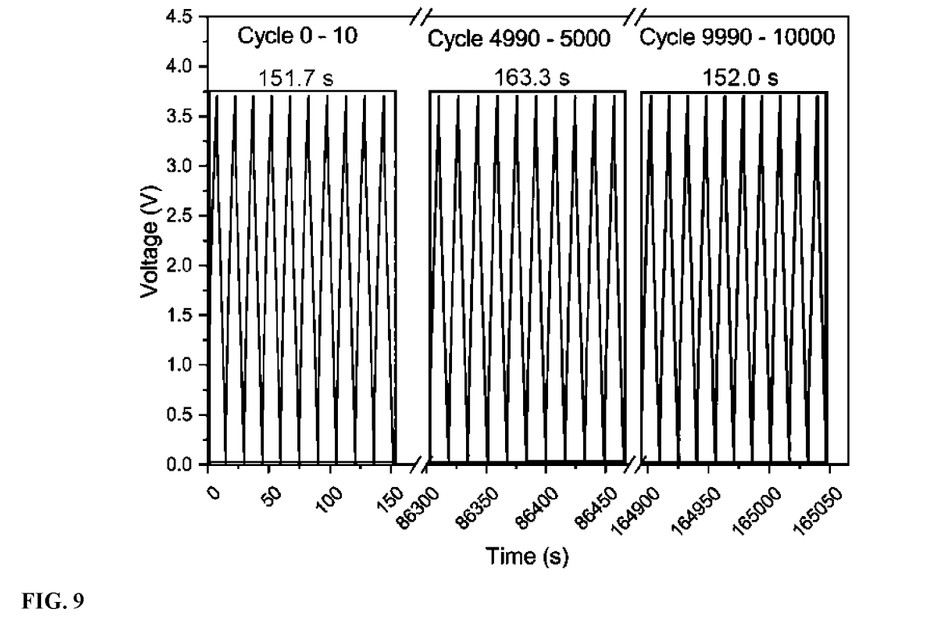
FIG. 9. Cyclic stability of the material produced from Example 1, showing the galvanostatic charge-discharge profiles during the beginning, the middle and final part of the testing for 10000 cycles.

Cyclic voltammetry (FIG. 8a,b) showed quasi-rectangular curves, with minor redox peaks, evident mainly at lower scan rates, which can be probably attributed to the nitrogen atoms. The galvanostatic charge/discharge (FIG. 8c) measurements showed practically linear and symmetric profiles (124 s charging, 118 s discharging at 1 A/g, 95% energy efficiency), which improved to 100% efficiency at 5 A/g (22 s charging, 22 s discharging) (Table 5). The performance of the device is described in Table 5 showing an unprecedented volumetric energy density of 169.8 Wh/L at a power density of 5.2 kW/L. The capacitance retention was 94% after 10000 cycles. The stability of the cell was also very high, keeping 100% of its capacitance after 10000 cycles (FIG. 9).

TABLE 5

Performance characteristics of the supercapacitor full-cells built from the product of Example 1 showing the current density, discharge time (t), gravimetric capacitance ($C_g$), gravimetric energy and power densities ($E_g$ and $P_g$ respectively) as well as the volumetric capacitance, energy and power densities ($C_v$, $E_v$ and $P_v$ respectively).

| Current density A/g | t s | $C_g$ F/g | $E_g$ Wh/kg | $P_g$ kW/kg | $C_v$ F/cm³ | $E_v$ Wh/L | $P_v$ kW/L |
|---|---|---|---|---|---|---|---|
| 2 | 118 | 127.6 | 60.6 | 1.8 | 357.3 | 169.8 | 5.2 |
| 10 | 22 | 124 | 56.5 | 8.4 | 347.2 | 144.9 | 23.7 |
| 20 | 10 | 117.6 | 51.4 | 15.6 | 329.3 | 121.5 | 43.7 |

Example 6: Electrochemical Testing in a Two Electrode Symmetric Supercapacitor Full-Cell Using the Product from Example 4 (Comparative Example, No Dialysis)

Figure 10:
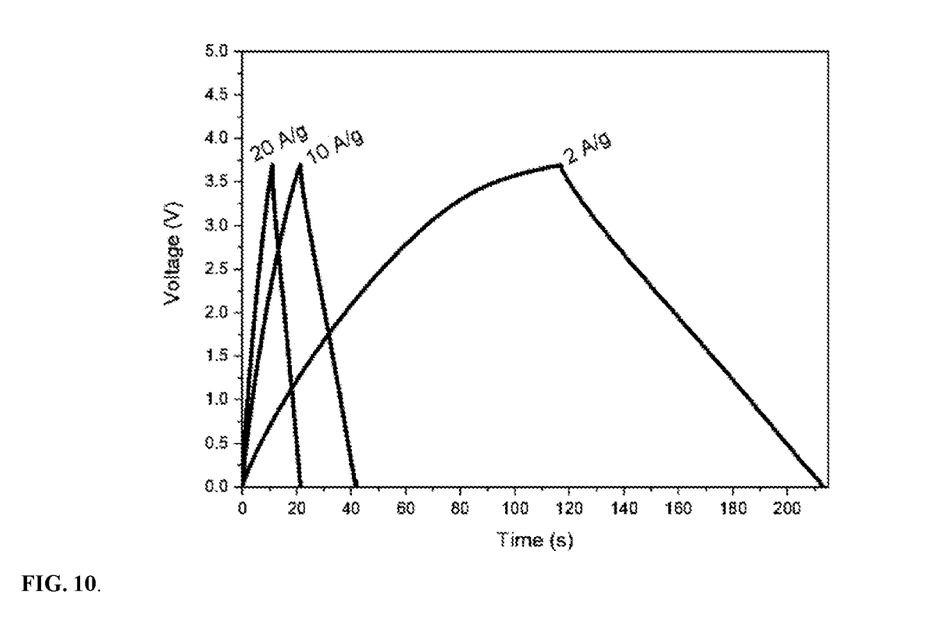
FIG. 10. Galvanostatic charge-discharge profiles at different current densities of the procedure described in Example 6, in EMIM-BF$_4$ and TTE (9:1) electrolyte.

The experiment of Example 5 was repeated, using the product obtained from Example 4 (no sonication, no dialysis). The density of the films produced was 0.7 $g/cm^{-1}$. The galvanostatic charge/discharge measurements showed very good performance stability with increasing current density (from 2 A/g to 20 A/g) (FIG. 10 and Table 6). The gravimetric energy density was only slightly lower than in the case of the product from Example 1, but the volumetric energy density significantly dropped from 169.8 Wh/L to 35.4 at a power density of 1.3 kW/L for 2 A/g current density. The drop in the volumetric energy density is caused by the much lower packing density, due to low density caused in particular by omission of the dialysis step in preparation of the doped graphene.

TABLE 6

Performance characteristics of the supercapacitor full-cell built from the product of Example 4 showing the current density, discharge time (t), gravimetric capacitance ($C_g$), gravimetric energy and power densities ($E_g$ and $P_g$ respectively) as well as the volumetric capacitance, energy and power densities ($C_v$, $E_v$ and $P_v$ respectively).

| Current density A/g | t s | $C_g$ F/g | $E_g$ Wh/kg | $P_g$ kW/kg | $C_v$ F/cm³ | $E_v$ Wh/L | $P_v$ kW/L |
|---|---|---|---|---|---|---|---|
| 2 | 97.3 | 105.2 | 50 | 1.9 | 73.6 | 35.4 | 1.3 |
| 10 | 20 | 108 | 51.3 | 9.3 | 75.6 | 36.3 | 6.5 |
| 20 | 10.4 | 108 | 51.3 | 18.5 | 75.6 | 36.3 | 13.1 |

Example 7: Electrochemical Testing in a Two Electrode Symmetric Supercapacitor Full-Cell Using the Product from Example 2 (4 h Product)

Figure 11:
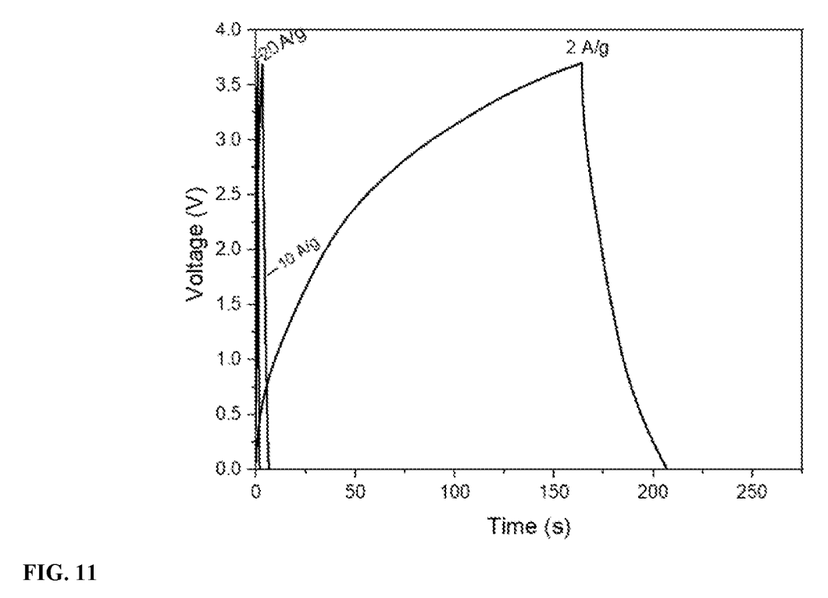
FIG. 11. Galvanostatic charge-discharge profiles at different current densities of the procedure described in Example 7, in EMIM-BF$_4$ and TTE (9:1) electrolyte.

The experiment of Example 5 was repeated, using the product obtained from Example 2 (4 h reaction). The density of the films produced was 1.4 $g/cm^{-1}$. The galvanostatic charge/discharge measurements showed low performance (FIG. 11 and Table 7). Both the gravimetric and volumetric data were significantly lower than Example 1.

TABLE 7

Performance characteristics of the supercapacitor full-cell built from the product of Example 2 showing the current density, discharge time (t), gravimetric capacitance ($C_g$), gravimetric energy and power densities ($E_g$ and $P_g$ respectively) as well as the volumetric capacitance, energy and power densities ($C_v$, $E_v$ and $P_v$, respectively).

| Current density A/g | t s | $C_g$ F/g | $E_g$ Wh/kg | $P_g$ kW/kg | $C_v$ F/cm$^3$ | $E_v$ Wh/L | $P_v$ kW/L |
|---|---|---|---|---|---|---|---|
| 2 | 43 | 46.4 | 22 | 1.8 | 64.9 | 32.3 | 2.7 |
| 10 | 3.3 | 3.5 | 1.6 | 0.5 | 4.9 | 2.4 | 0.7 |

Example 8: Electrochemical Testing in a Two Electrode Symmetric Supercapacitor Full-Cell Using the Product from Example 3 (24 h Product)

Figure 12:
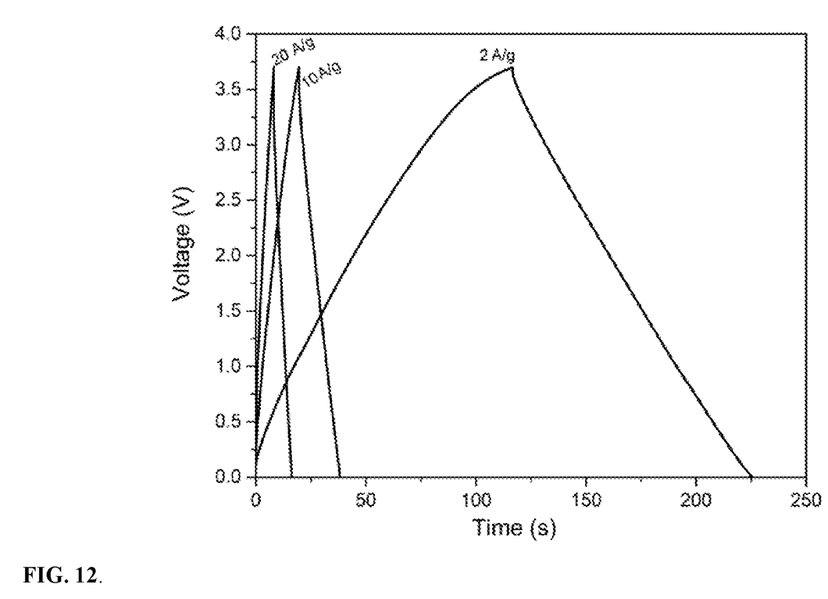
FIG. 12. Galvanostatic charge-discharge profiles at different current densities of the procedure described in Example 8, in EMIM-BF$_4$ and TTE (9:1) electrolyte.

The experiment of Example 5 was repeated, using the product obtained from Example 3 (24 h reaction). The density of the films produced was 1.4 g/cm$^{-1}$. The galvanostatic charge/discharge measurements showed performance close to Example 1 (72 h product) (FIG. 12 and Table 8). The significantly lower density though, resulted in significantly lower volumetric energy density than the 72 h product of Example 1 as measured in Example 5.

TABLE 8

Performance characteristics of the supercapacitor full-cell built from the product of Example 3 showing the current density, discharge time (t), gravimetric capacitance ($C_g$), gravimetric energy and power densities ($E_g$ and $P_g$ respectively) as well as the volumetric capacitance, energy and power densities ($C_v$, $E_v$ and $P_v$, respectively).

| Current density A/g | t s | $C_g$ F/g | $E_g$ Wh/kg | $P_g$ kW/kg | $C_v$ F/cm$^3$ | $E_v$ Wh/L | $P_v$ kW/L |
|---|---|---|---|---|---|---|---|
| 2 | 108.6 | 117 | 54.3 | 1.8 | 152.0 | 81.4 | 2.7 |

The invention claimed is:

1. A method for preparation of nitrogen-doped graphene which contains the following steps:
   a) providing a dispersion of fluorinated graphite;
   b) subjecting the dispersion of fluorinated graphite to sonication and/or mechanical treatment and/or thermal treatment;
   c) contacting the product from step b) with an azide reagent at a temperature within the range of 40 to 200° C.;
   d) separating the solid product formed in step c) from the mixture;
   e) dialyzing the product obtained in step d) against water.

2. The method according to claim 1, wherein initial content of fluorine in the starting fluorinated graphite is at least 40 at. %, more preferably at least 45 or at least 50 at. %, relative to the total atoms present in the sample and determined by X-ray photoelectron spectroscopy (XPS) using an Al-Ka source.

3. The method according to claim 1, wherein the dispersion prepared in step a) is a dispersion of fluorinated graphite in a polar organic solvent, preferably selected from dimethylformamide, dimethylsulfoxide, A'-methylpyrrolidone, glycols such as ethylene glycol, and mixtures thereof.

4. The method according to claim 1, wherein azide reagent is added in the form of powder to the mixture from step b), or in the form of a suspension in a polar solvent, wherein the polar solvent is preferably selected from dimethylformamide, dimethylsulfoxide, A-methylpyrrolidine, glycols such as ethylene glycol, and mixtures thereof.

5. The method according to claim 1, wherein the azide reagent is selected from metal azides and tri(C1-C4)alkylsilyl azides, preferably the azide reagent is selected from NaN 3, KN 3, L1N3, Pb(N3) 2, trimethylsilyl azide.

6. The method according to claim 1, wherein after contacting the product of step b) containing fluorinated graphite with the azide reagent, the mixture is subjected to heating to a temperature within the range of 70-170° C., even more preferably 100-140° C., wherein the heating is carried out for at least 4 hours, preferably for 4 hours to 20 days, even more preferably for at least 24 hours.

7. Nitrogen-doped graphene containing at least 8.9 at. % of nitrogen and up to 16.6 at. % of fluorine, wherein the at. % are relative to the total atoms present in the sample and determined by X-ray photoelectron spectroscopy (XPS) using an Al-Ka source; and having a density above 1.2 g/cm 3 when pressed at 80 kN for 1 min.

8. Nitrogen-doped graphene according to claim 7, containing at least 13.9 at. % of nitrogen and up to 5 at. % of fluorine, relative to the total atoms present in the sample and determined by X-ray photoelectron spectroscopy (XPS) using an Al-Ka source.

9. Nitrogen-doped graphene according to claim 7, containing at least 16 at. % of nitrogen and up to 5 at. % of fluorine, relative to the total atoms present in the sample and determined by X-ray photoelectron spectroscopy (XPS) using an Al-Ka source.

10. Nitrogen-doped graphene according to claim 8, containing 0.1 to 2 at. % of fluorine, relative to the total atoms present in the sample and determined by X-ray photoelectron spectroscopy (XPS) using an Al-Ka source.

11. Nitrogen-doped graphene according to claim 7, having a density of at least 1.4 g/cm 3 when pressed at 80 kN for 1 min.

12. A supercapacitor having an electrode formed from nitrogen-doped graphene according to claim 7.

13. An electrical cell comprising at least two electrodes, a separator and an electrolyte, characterized in that at least one electrode contains or consists of the nitrogen-doped graphene according to claim 7.

14. The electrical cell according to claim 13, wherein the electrolyte contains an ionic liquid.

* * * * *